United States Patent
Brun et al.

(10) Patent No.: US 6,517,341 B1
(45) Date of Patent: Feb. 11, 2003

(54) METHOD TO PREVENT RECESSION LOSS OF SILICA AND SILICON-CONTAINING MATERIALS IN COMBUSTION GAS ENVIRONMENTS

(75) Inventors: Milivoj Konstantin Brun, Ballston Lake, NY (US); Krishan Lal Luthra, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/259,364

(22) Filed: Feb. 26, 1999

(51) Int. Cl.[7] ............... F23J 7/00; F27D 1/16; F23B 7/00
(52) U.S. Cl. ............ 431/2; 431/4; 427/255.18; 427/237; 44/320; 264/30; 110/343
(58) Field of Search .................. 431/2, 4; 427/140, 427/142, 239, 331, 238, 237, 249.15, 255.11, 255.18, 255.17, 255.19, 255.21, 255.37, 255.393; 44/320, 321, 357, 362, 364, 370, 385; 264/30; 110/343, 342

(56) References Cited

U.S. PATENT DOCUMENTS

| | | | |
|---|---|---|---|
| 2,811,467 A | 10/1957 | Hull et al. | 427/333 |
| 2,867,516 A * | 1/1959 | Pedersen | 44/361 |
| 3,843,306 A | 10/1974 | Whittington et al. | 431/8 |
| 3,994,699 A | 11/1976 | Scott | 44/320 |
| 4,047,875 A | 9/1977 | May et al. | 431/3 |
| 4,061,473 A | 12/1977 | Norris | 44/320 |
| 4,131,433 A | 12/1978 | Scott | 44/320 |
| 4,466,997 A | 8/1984 | Prescott | 44/320 |
| 4,471,738 A * | 9/1984 | Smojver | 60/276 |
| 4,478,602 A * | 10/1984 | Kelley et al. | 44/51 |
| 4,541,838 A | 9/1985 | Zaweski et al. | |
| 4,542,888 A * | 9/1985 | Robyn et al. | 264/30 |
| 5,015,540 A | 5/1991 | Borom et al. | |
| 5,094,901 A * | 3/1992 | Gray | 428/141 |
| 5,298,587 A * | 3/1994 | Hu et al. | 427/489 |
| 5,330,854 A | 7/1994 | Singh et al. | |
| 5,336,350 A | 8/1994 | Singh | |
| 5,435,948 A * | 7/1995 | Staffolani et al. | 264/30 |
| 5,613,988 A | 3/1997 | Spiegler et al. | 44/320 |
| 5,620,485 A | 4/1997 | Fey | 44/320 |
| 5,677,060 A * | 10/1997 | Terentieva et al. | 427/228 |
| 5,686,028 A * | 11/1997 | Meynckens et al. | 264/30 |
| 5,688,295 A | 11/1997 | Yang | 44/320 |
| 5,767,192 A | 6/1998 | Battice et al. | 44/320 |
| 5,871,820 A * | 2/1999 | Hasz et al. | 427/419.2 |
| 5,914,189 A * | 6/1999 | Hasz et al. | 428/335 |

(List continued on next page.)

FOREIGN PATENT DOCUMENTS

| | | | | |
|---|---|---|---|---|
| AU | 124609 | * | 7/1947 | 427/140 |
| EP | 0048910 | | 4/1982 | |
| EP | 0425825 | | 5/1991 | |
| EP | 0493376 | | 7/1992 | |
| GB | 748478 | * | 5/1956 | 427/140 |
| GB | 2 110 200 A | * | 6/1983 | |

OTHER PUBLICATIONS

"Paralinear Oxidation of CVD SiC in Water Vapor", by E. J. Opila, J. Am. Ceram. Soc., 80 (1) 197–205 (1997).

Pending U.S. patent application Ser. No. 08/777,129, filed Dec. 30, 1996, by A. Szweda et al., entitled "Article and Method for Making Complex Shaped Preform and Silicon Carbide Composite by Melt Infiltration".

*Primary Examiner*—Henry Bennett
*Assistant Examiner*—Josiah C. Cocks
(74) *Attorney, Agent, or Firm*—Noreen C. Johnson; Christian G. Cabou

(57) ABSTRACT

While silicon-containing ceramics or ceramic composites are prone to material loss in combustion gas environments, this invention introduces a method to prevent or greatly reduce the thickness loss by injecting directly an effective amount, generally in the part per million level, of silicon or silicon-containing compounds into the combustion gases.

45 Claims, 2 Drawing Sheets

U.S. PATENT DOCUMENTS

| | | | |
|---|---|---|---|
| 5,931,977 A | 8/1999 | Yang | 44/320 |
| 5,944,858 A | 8/1999 | Wallace | 44/359 |
| 5,952,100 A * | 9/1999 | Corman et al. | 428/384 |
| 5,955,182 A * | 9/1999 | Yasuda et al. | 428/217 |
| 5,955,391 A * | 9/1999 | Kameda et al. | 427/226 |
| 6,045,877 A * | 4/2000 | Gleason et al. | 427/522 |

\* cited by examiner

METHOD TO PREVENT RECESSION LOSS OF SILICA AND SILICON-CONTAINING MATERIALS IN COMBUSTION GAS ENVIRONMENTS

This invention was performed under a United States government contract with the Department of Energy, contract number DE-FC02-92CE41000. The United States government may have certain rights in the invention.

BACKGROUND OF THE INVENTION

The invention relates to silicon-containing materials in combustion gas environments, and more particularly, relates to a method to reduce or prevent the material loss of silica and silicon-containing materials in high temperature combustion gas environments, such as encountered in industrial land-base turbines, aircraft engines, automobiles and heat exchangers.

Silicon-based monolithic ceramics, such as silicon carbide, silicon nitride, and silicon-containing composites, including continuous-fiber reinforced ceramic composites, are attractive candidates for high temperature structural applications, such as component parts for gas turbines, aircraft engines, and heat exchangers. These silicon-containing materials are particularly appealing because of their excellent high temperature properties and lower density. For instance, in combustion gas environments, a performance benefit is obtained by replacing cooled metal components with uncooled or reduced cooling silicon-containing ceramic components. Material substitution of hot gas path components with such ceramics yields higher output power, improved thermal efficiency and reduced NOx emissions. Depending on the size of the component part and the mechanical specifications that the component must meet in service, silicon-containing composite ceramics including continuous or discontinuous-fiber reinforced ceramic composites, such as silicon carbide fiber reinforced silicon carbide or silicon-silicon carbide matrix composites, are sometimes selected over monolithic ceramics because of superior thermal and mechanical shock resistance, higher damage tolerance and strain-to-failure. Examples of discontinuous fiber reinforced composites include composites reinforced with silicon carbide whiskers. Examples of monolithic ceramics are silicon carbide, silicon nitride, and silicon-silicon carbide ceramics.

A primary advantage then of silicon-containing ceramics or silicon-containing composites (herein, silicon-containing ceramics or composites) over metals is their superior high temperature durability which enable higher turbine rotor inlet temperatures. In addition, they exhibit low coefficient of thermal expansion and lower density in comparison to nickel-base superalloys. The relatively high thermal conductivity of silicon-containing composite systems is similar to nickel-based alloys at the use temperatures.

The gas turbine component parts where silicon-containing ceramics or silicon-containing composites are being considered include the shroud and the combustion liner. The shroud forms the turbine outer flowpath and creates a sealing surface over the rotor buckets. It is a primary element in the turbine tip clearance and roundness system and is segmented in larger machines. It serves as a heat shield and insulates the turbine casing from the hot gas stream temperature. As part of the flow path, the shroud must have sufficient oxidation/corrosion resistance and be structurally sufficient to meet design life requirements for the engine temperature, pressure and flow environment.

The combustion liner contains the combustion reaction zone and conveys the hot gases to the turbine inlet. In low emissions combustors the flame temperature is minimized to limit production of thermal NOx. This is accomplished by putting most of the compressor air, except for turbine cooling air, through the premixers and minimizing the amount of cooling or dilution air through the liner. Complex thermal gradients and elevated temperatures in liners can lead to excessive distortion in metals causing loss of sealing, restrictions in cooling air flow, and increases in hot side heat transfer. Silicon-containing composites offer low cycle creep-fatigue resistance and very little deformation. As the case with the shroud, the combustion liner must have sufficient oxidation/corrosion resistance. Additional pieces of turbine components comprise nozzles, vanes, blades, buckets and transition pieces.

High oxidation resistance is imparted by formation of a protective silica ($SiO_2$) film on the silicon-containing ceramic or composite surface. The above proposed applications for the silicon-containing materials position them in direct contact with combustion gases, which are the product of the combustion of liquid fuels or natural gas hydrogen or coal. For natural gas, liquid or coal fuels, the products of combustion contain up to about nineteen percent water vapor by volume dependent on the fuel-to-air ratio. Even higher water vapor levels are obtained for mixtures of natural gas and hydrogen or for pure hydrogen. In an environment containing water vapor and oxygen, thermodynamic calculations indicate the primary reactions which occur for the oxidation of silicon (present for example, as silicon carbide) are:

$$SiC + 3/2 O_2(g) = SiO_2 + CO(g) \tag{1}$$

$$SiC + 3H_2O(g) = SiO_2 + 3H_2(g) + CO(g) \tag{2}$$

Hydrogen and carbon monoxide react together to form water vapor and carbon dioxide. The silica film formed on the silicon-containing ceramic or composite in an oxygen/water vapor gas mixture may simultaneously volatilize by forming a silicon hydroxide or silicon oxyhydroxide species. For instance, some possible volatilization reactions are:

$$SiO_2 + H_2O(g) = SiO(OH)_2(g) \tag{3}$$

$$SiO_2 + 2H_2O(g) = Si(OH)_4(g) \tag{4}$$

$$2SiO_2 + 3H_2O(g) = Si_2O(OH)_6(g) \tag{5}$$

The volatilization of silica results in material loss resulting in reduction of the thickness of the silicon-containing ceramic or composite materials. The observed rates of loss are of the order of a few mils to tens of mils per thousand hours of operation in the combustion gas environment. Depending on the fuel used, such fuel as natural gas, the reaction is favored by high water vapor content (up to about 19% by volume), high pressures (generally up to 30–40 ATM) and high temperatures (up to about 1200–1500° C.) found in many turbine, engine and heat exchanger applications. Thus, for long-term chemical durability of silicon-containing ceramics or composites in combustion environments the volatility of the silica film needs to be controlled during the lifetime of the component.

SUMMARY OF THE INVENTION

The above-identified needs are satisfied by this invention which provides a method to reduce material loss of the silicon-containing ceramics and silicon-containing ceramic composites in a combustion gas environment comprising the step of injecting an effective amount of silicon into said combustion gas environment, where the silicon is at least one of elemental silicon, a silicon-containing compound or mixtures thereof. The silicon or silicon-containing compound(s) can be added to the combustion gases, the fuel, the combustion air, directly to the combustor or mixtures thereof. Further, some ways that the silicon or silicon-containing compounds can be added to the combustion gas environment are as solid matter, a slurry liquid or suspension, a liquid, a liquid solution, an atomizing spray a gaseous substance or a mixture of any of the above-mentioned. An effective amount of silicon means an amount of silicon in the combustion gas environment that prevents or reduces the volatilization of the silica film located on the silicon-containing ceramic or on the silicon-containing ceramic composite, and which may further prevent the recession loss of the silicon-containing ceramic or ceramic composite. As a result of reducing the volatilization of the silica film, the underlying silicon-containing ceramic or ceramic composite substantially maintains its operational thickness and does not suffer from attack and recession in the combustion environment. This invention is also useful when protective coatings are used on the components in combustion gas environments.

In this invention the term 'material loss' means that material loss of the composite occurs through reaction of silicon-containing material with a gas atmosphere, particularly water vapor, at high temperatures. In a fully dense material, the material loss results in reduction of the thickness of the component. If the material is porous, there will be material loss also taking place within the open porosity, in addition to thickness reduction similar to that of a dense material. Thus porous material is going to experience higher material loss than a fully dense material.

Yet another embodiment of the invention is a method to maintain long-term chemical durability of silicon-containing ceramics including intermetallics, or silicon-containing composites in combustion gas environments comprising mixing parts per million of silicon or silicon-containing compounds in combustion gases during operation of a turbine engine or heat exchanger.

Another embodiment of the invention is a silicon-containing ceramic or ceramic composite component in a combustion gas environment of at least 500° C. having a chemically stable silicon oxide film on a surface of said ceramic or ceramic composite component.

DESCRIPTION OF THE INVENTION

Figure 1:
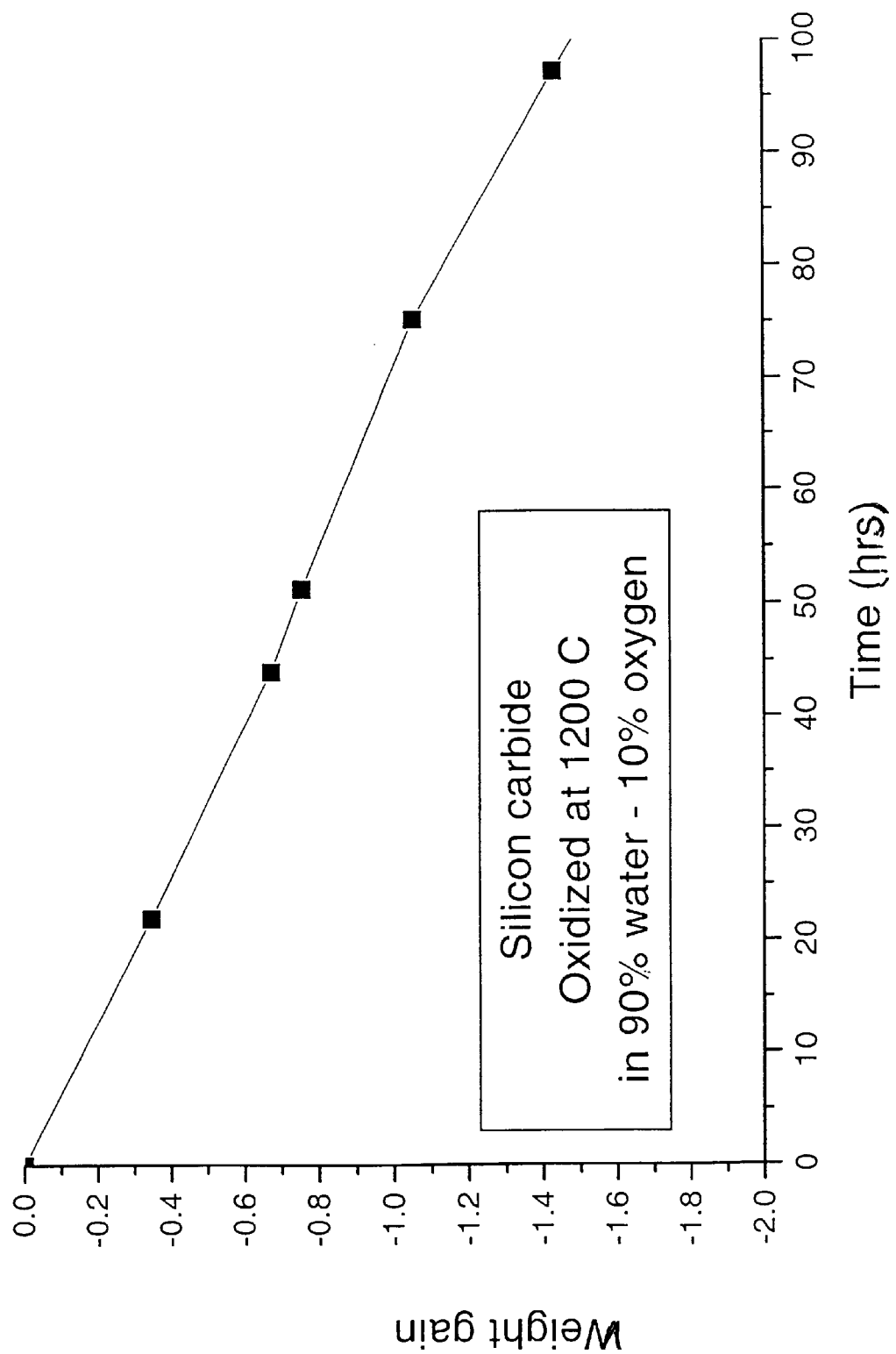
FIG. 1. Depicts a graph showing the weight loss of a silicon carbide sample exposed to a steam environment.

While silicon-containing ceramics or ceramic composites are prone to thickness loss (also sometimes referred to as recession loss or material loss) in combustion gas environments, this invention introduces a method to prevent or greatly reduce the material loss by injecting an effective amount, generally in the part per million level, of silicon or silicon-containing compounds into the combustion gases. An example of an effective amount is a silicon level of about 0.01 to about 10.0 parts per million or about 0.009 to 0.6 parts per million by weight of the combustion gases. The silicon or silicon-containing compounds can be added directly to the combustion fuel, to the combustion air, directly to the combustor, directly to the combustion gases, or all of the above. The silicon or silicon-containing compounds can be in the solid, liquid, or gaseous state, provided that the compounds volatilize in the combustion gases. Thus an important aspect of the present invention is the prevention or alleviation of material loss by preventing the reaction of the silicon-containing ceramic or ceramic composite components with the combustion gases.

The silicon-containing ceramic or ceramic composite can be a silicon-based ceramic or ceramic composite where the largest percentage of the material composition by weight is silicon. Likewise, the silicon-containing ceramic composite can be a continuous fiber reinforced ceramic composite, sometimes referred to as CFCC. Examples of silicon-containing ceramics are silicon carbide (SiC), silicon nitride ($Si_3N_4$), silicon-silicon carbide, and molybdenum disilicide. Examples of silicon-containing ceramic composites are silicon-silicon carbide composites (Si/SiC) and silicon carbide-silicon carbide composites (SiC/SiC), to mention a few. An example of a silicon-containing continuous fiber ceramic composite is a silicon-silicon carbide composite with silicon carbide-containing fibers and any of the above mentioned ceramics or composites that contain fibers are CFCC. By "silicon carbide-containing fiber" is meant a fiber having a composition that contains silicon carbide, and preferably contains substantially silicon carbide. For instance, the fiber may have a silicon carbide core surrounded with carbon, or in the reverse, the fiber may have a carbon core surrounded by or encapsulated with silicon carbide. These examples are given for demonstration of the term "silicon carbide-containing fiber" and are not limited to this specific combination. Other fiber compositions are contemplated, so long as they contain silicon carbide.

For instance, other core materials which may be enveloped by silicon carbide include carbon and tungsten. The fibrous material can be amorphous, crystalline, or a mixture thereof. The crystalline material may be single crystal or polycrystalline. Examples of silicon carbide-containing fibrous materials are silicon carbide, Si—C—O, Si—C—O—N, Si—C—O-Metal, and Si—C—O-Metal where the Metal component can vary but frequently is titanium or zirconium or aluminum. There are processes known in the art which use organic precursors to produce silicon carbide-containing fibers which may introduce a wide variety of elements into the fibers.

Additionally, a continuous fiber reinforced silicon-containing ceramic composite may comprise a silicon-silicon carbide composite or a silicon carbide-silicon carbide composite with carbon-containing or silicon-containing fibers or silicon and carbon containing fibers with or without coatings on said fibers. Acceptable coatings for such fibers would be, but not limited to, nitrides, borides, carbides, oxides, silicides, or other similar ceramic refractory material. Representative of ceramic carbide coatings are carbides of boron, chromium, hafnium, niobium, silicon, tantalum, titanium, vanadium, zirconium, and mixtures thereof. Representative of the ceramic nitrides useful in the present process is the nitride of boron, hafnium, niobium, silicon, tantalum, titanium, vanadium, zirconium, and mixtures thereof. Examples of ceramic borides are the borides of hafnium, niobium, tantalum, titanium, vanadium, zirconium, and mixtures thereof. Examples of oxide coatings are oxides of aluminum, yttrium, titanium, zirconium, beryllium, silicon, and the rare earths. The thickness of the coating can be about 0.1 to about 4.0 micrometers thick. A preferred thickness is about 0.3–1.0 micrometers. Some other examples of coatings for fibers are selected from the group consisting of boron nitride, silicon doped boron nitride, silicon nitride, silicon carbide, carbon and mixtures thereof.

The fibrous material may have more than one coating. An additional coating should be wettable with silicon and be about 500 Angstroms to about 3 micrometers. Representative of useful silicon-wettable materials is elemental carbon, metal carbide, a metal coating which later reacts with molten silicon to form a silicide, a metal nitride such as silicon nitride, and a metal silicide. Elemental carbon is preferred and is usually deposited on the underlying coating in the form of pyrolytic carbon. Generally, the metal carbide is a carbide of silicon, tantalum, titanium, or tungsten. The metal nitride may be a nitride of boron, hafnium, niobium, silicon, tantalum, titanium, vanadium, zirconium, and mixtures thereof. Generally, the metal silicide is a silicide of chromium, molybdenum, tantalum, titanium, tungsten, and zirconium. The metal which later reacts with molten silicon to form a silicide must have a melting point higher than the melting point of silicon and preferably higher than about 1450° C. Usually, the metal and silicide thereof are solid in the present process. Representative of such metals is chromium, molybdenum, tantalum, titanium, and tungsten.

The silicon-containing ceramics or composites are made by methods known in the art. To illustrate this point, a silicon-silicon carbide composite can be made by melt infiltration techniques, as described in U.S. Pat. Nos. 5,015,540; 5,330,854; and 5,336,350, incorporated herein by reference. Also, the continuous fiber silicon-containing ceramic composites can be made by various methods known in the art, such as taught in U.S. Pat. No. 6,024,898 (Ser. No. 08/777,129), incorporated herein by reference.

This invention is applicable to any silicon-containing material that is exposed to combustion gas environments. Examples of components or parts used in turbine engines are combustion liners, vanes and blades, nozzles, buckets, transition pieces, shrouds, and retrofit ceramic vanes.

It is desirable to add the silicon or silicon-containing compounds in a form that leads to rapid volatilization of silicon as silicon hydroxide. If rapid volatilization does not occur, then greater levels of silicon than those demonstrated in Tables 1 and 2 would be needed to prevent recession or thickness loss of the silica film and the underlying silicon-containing ceramic or composite. The silicon compounds can be added to the liquid fuel as organic compounds in a solution or as a slurry that can be emulsified. Examples of organic compounds that can be used for addition to the fuel are siloxanes, such as, but not limited to, octamethylcyclotetrasiloxane $\{Si_4O_4(CH_3)_8\}$ and hexamethyidisiloxane $\{Si_2O(CH_3)_6\}$. Both of these compounds are low viscosity liquids with good stability toward water vapor in air.

The silicon-containing compounds can also be added into the air used for combustion. They can be added downstream of the compressor and just before the combustor. They can also be added directly into the combustion gases but it would be preferable to add them into the air used for combustion which will allow rapid volatilization. The silicon-containing compounds can be in the form of organic compounds, which would volatilize readily, or in the form of slurries of fine particulate silicon-containing compounds, such as, but not limited to, silicon oxide, silicon, silicon carbide, silicon nitride, silicon boride, and mixtures thereof. Additionally, the silicon-containing compound is selected from the group consisting of siloxanes, silanes, silica, silicones, silicon carbides, silicon nitrides, silicon oxides, silicates, sand and mixtures there of. Tetramethylsilane $\{Si(CH_3)_4\}$ with a boiling point of 26.5° C., can be added directly to the natural gas fuel. The siloxanes mentioned above, octamethylcyclotetrasiloxane $\{Si_4O_4(CH_3)_8\}$ and hexamethyldisiloxane $\{Si_2O(CH_3)_6\}$, have higher boiling points then tetrametylsilane, so they could be injected as liquids into the compressed air just ahead of pre-mixers. The technique would also include premixed prevaporized concepts, where prevaporization of the fuel and silicon-containing material then undergoes premixing of the vaporized fuel/silicon-containing material with the compressed air before combustion occurs. In addition, colloidal silica dispersed in water can be injected directly into the air stream before the combustor. The colloidal silica is present in the dispersion in an amount up to 60 weight percent, and preferably about 40 weight percent.

The silicon introduced into the combustion gases will be exhausted from the turbine or other combustion gas environment in the form of fine silica or other compounds which could form by reaction of the silica with other impurities present in the fuel or air. High purity liquid fuels typically contain a few parts per million of impurities. Many liquid fuels used in industrial gas turbines contain tens to several hundreds parts per million of impurities which ultimately go into the exhaust gases. By using the method of this invention and injecting the combustion gases with silicon or silicon-containing compounds, the particulate level in the exhaust gases would increase for high purity fuels, such as used in aircraft engines, and would be negligible change for impure or dirty fuels used in turbines.

The level of silicon needed by injection or mixing into the combustion gases is an amount to form a sufficient concentration of silicon hydroxide products, such as $Si(OH)_4$ so as to significantly reduce or eliminate the thermodynamic force for volatilization of the silica (silicon oxide) film, located on silicon-containing ceramic or ceramic composite components. The silicon levels needed to alleviate or prevent the thickness loss of the silica film and the component increase with the stoichiometric ratio, pressure, and temperature. The higher the water vapor level in the combustion gases, the higher the silicon level that is needed to be injected into the combustion gases. For instance, by calculating the hydrogen/carbon ratio (H/C) in the fuel, one can calculate the water vapor level in the combustion gases and the amount of silicon needed to convert to silicon hydroxide or silicon oxyhydroxide products. The natural gas fuel with the H/C atomic ratio of about 4.0 would require a higher silicon injection level compared to liquid fuels with a H/C atomic ratios of about 1.7 to about 2.0. The fuel to air ratio of about one, which is a stoichiometric mixture, corresponds to the ratio that will burn with no excess air. A ratio below one indicates an excess of air while a ratio above one indicates insufficient air for combustion. The method outlined can be used for air to fuel ratios both below and above one. Table 1 demonstrates the results for a stoichiometric ratio up to one using silicon doping levels under varying turbine operating conditions. The silicon levels are given both for fuel and air. The required silicon levels in combustion gases will be essentially similar to those in air because the air/fuel weight ratios are very high. The silicon levels needed to prevent the recession loss are expected to be maximum for a stoichiometric ratio of about 1 but could be easily determined by proper experimentation by one skilled in the art. At higher stoichiometric ratios, the water vapor content would again decrease which would require optimization of additions of silicon or silicon compounds to be defined by test conditions.

TABLE 1

Silicon doping levels needed to alleviate silica and silicon-containing ceramics or ceramic composite surface recession loss under different turbine operating conditions.

| Fuel Type | Stoichiometric Ratio (Phi) | Air/Fuel Ratio (By Weight) | Water Level in gasses (Vol %) | Pressure (atm) | Temp. (° C.) | Silicon Levels Required (ppm) In Fuel | In Air |
|---|---|---|---|---|---|---|---|
| Natural Gas | 0.250 | 68.7 | 5.1 | 15 | 1100 | 6.5 | .10 |
| | 0.250 | 68.7 | 5.1 | 15 | 1200 | 9.1 | 0.13 |
| | 0.250 | 68.7 | 5.1 | 15 | 1300 | 12.3 | 0.18 |
| | 0.250 | 68.7 | 5.1 | 15 | 1400 | 15.9 | 0.23 |
| | 0.325 | 52.8 | 6.6 | 15 | 1100 | 8.4 | 0.16 |
| | 0.325 | 52.8 | 6.6 | 15 | 1200 | 11.8 | 0.22 |
| | 0.325 | 52.8 | 6.6 | 15 | 1300 | 15.8 | 0.30 |
| | 0.325 | 52.8 | 6.6 | 15 | 1400 | 20.5 | 0.38 |
| | 0.400 | 42.9 | 8.1 | 15 | 1100 | 10.3 | 0.24 |
| | 0.400 | 42.9 | 8.1 | 15 | 1200 | 14.4 | 0.34 |
| | 0.400 | 42.9 | 8.1 | 15 | 1300 | 19.3 | 0.45 |
| | 0.400 | 42.9 | 8.1 | 15 | 1400 | 25.1 | 0.58 |
| | 0.250 | 68.7 | 5.1 | 1 | 1200 | 0.6 | 0.01 |
| | 0.250 | 68.7 | 5.1 | 10 | 1200 | 6.1 | 0.09 |
| | 0.250 | 68.7 | 5.1 | 20 | 1200 | 12.2 | 0.18 |
| | 0.250 | 68.7 | 5.1 | 30 | 1200 | 18.3 | 0.27 |
| Liquid Fuel | 0.250 | 57.1 | 3.1 | 15 | 1100 | 2.0 | 0.03 |
| | 0.250 | 57.1 | 3.1 | 15 | 1200 | 2.7 | 0.05 |
| | 0.250 | 57.1 | 3.1 | 15 | 1300 | 3.7 | 0.06 |
| | 0.250 | 57.1 | 3.1 | 15 | 1400 | 4.8 | 0.08 |
| | 0.325 | 44.0 | 4.0 | 15 | 1100 | 2.5 | 0.06 |
| | 0.325 | 44.0 | 4.0 | 15 | 1200 | 3.5 | 0.08 |
| | 0.325 | 44.0 | 4.0 | 15 | 1300 | 4.8 | 0.11 |
| | 0.325 | 44.0 | 4.0 | 15 | 1400 | 6.2 | 0.14 |
| | 0.400 | 35.7 | 4.9 | 15 | 1100 | 3.1 | 0.09 |
| | 0.400 | 35.7 | 4.9 | 15 | 1200 | 4.3 | 0.12 |
| | 0.400 | 35.7 | 4.9 | 15 | 1300 | 5.8 | 0.16 |
| | 0.400 | 35.7 | 4.9 | 15 | 1400 | 7.5 | 0.21 |

Benefits to protect the silica and silicon-containing ceramics and composites can also be obtained at lower silicon levels than those shown in Table 1. Some reduction will occur at silicon levels below those in Table 1. Table 2 show the effect of the silicon level on the reduction of the recession loss rate. Table 2 demonstrates that the recession loss problem can be fully prevented theoretically. However, in practice a 100% reduction of recession loss may not be achievable. Also, higher silicon levels, up to a factor of about 5 to about 10, than those shown in Tables 1 and 2 might be needed because of the slow rate of volatilization of silicon additives and because of different operating conditions of turbines than those shown in Tables 1 and 2.

TABLE 2

Effect of silicon level in combustion air on reduction in surface recession rate in silicon-containing ceramics*

| Silicon Level | 0.00 | 0.05 | 0.10 | 0.15 | 0.20 (ppm) in air |
|---|---|---|---|---|---|
| % Reduction | 0.0 | 22 | 45 | 67 | 90 |

*Pressure = 15 atm, Phi = 0.325 (stoichiometric ratio of fuel to air), Temperature = 1200° C.

To further demonstrate the invention, and in no way limiting the invention, the following examples are presented.

EXAMPLE 1

A piece of sintered silicon carbide was heat treated in a steam environment at 1200° C. The sample was 1 inch by 0.5 inches by 0.1 inch and a small hole was drilled at one end to suspend the sample from a platinum wire. The sample was held in a vertical tube furnace with an alumina muffle. The atmosphere was provided by flushing the tube with a mixture of 90% steam and 10% oxygen. The weight of the sample was recorded prior to the experiment. During the exposure, the sample was periodically taken out of the furnace and weighed. Results of the experiment are shown in FIG. 1. It can be seen that the sample is continually loosing weight. When silicon carbide is oxidized, the specimen gains weight. The weight loss is due to the reaction of the silica film with water which results in the removal of the film. The weight loss due to reaction of silica with water overwhelms the weight gain from the oxidation.

EXAMPLE 2

Figure 2:
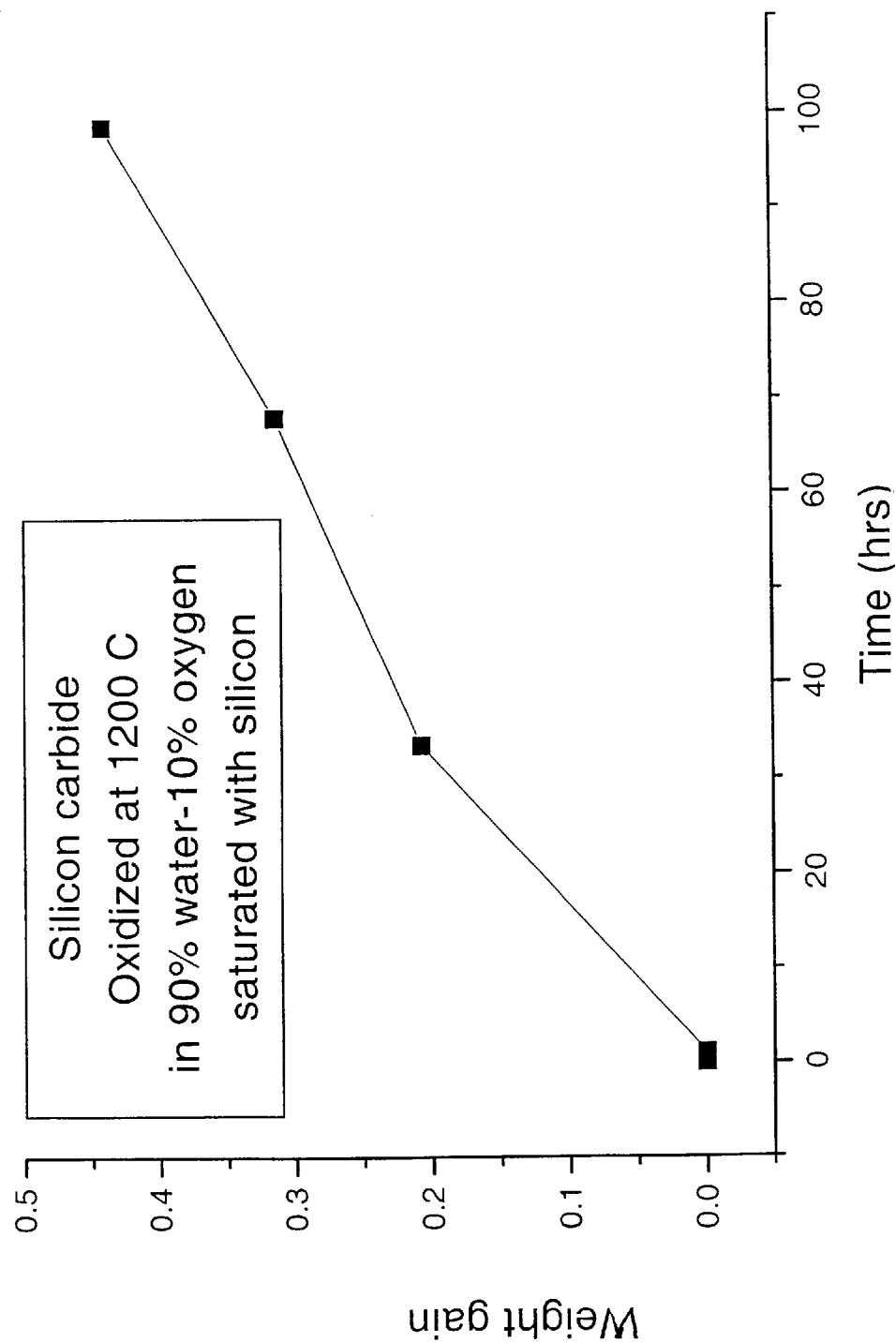
FIG. 2. Depicts a graph showing the control of weight loss in a silicon carbide sample in a silicon-saturated steam environment.

Another silicon carbide sample, similar in every respect to example 1, was heat treated at the same temperature in the same atmosphere. However, the gas was saturated with silicon prior to contacting the sample. Saturation of the gas with silicon was obtained by passing gas through a silica sponge held at the same temperature as the sample. The results of the exposure in silicon-saturated steam are shown in FIG. 2. The silicon carbide sample is showing continuous weight gain. The weight gain is due to oxidation of silicon carbide.

These examples show that saturation of the steam with silicon effectively prevents reaction of silica and water that results in mass loss of silicon carbide.

What is claimed:

1. A method to reduce material loss of silicon-containing ceramics and silicon-containing ceramic composites in a combustion gas environment comprising the step of injecting an effective amount of silicon into said combustion gas environment, where the silicon is at least one of elemental silicon, a silicon-containing compound or mixtures thereof where an effective amount of silicon is an amount of silicon injected in the combustion gas environment that prevents or reduces volatilization of a silica film located on the silicon-containing ceramic and silicon-containing ceramic composites.

2. A method according to claim 1 where the silicon-containing ceramic is selected from the group consisting of silicon carbide, silicon nitride, silicon-silicon carbide, molybdenum silicide and mixtures thereof.

3. A method according to claim 2 where the silicon-containing ceramic is silicon carbide.

4. A method according to claim 2 where the silicon-containing ceramic is silicon nitride.

5. A method according to claim 1 where the silicon-containing ceramic comprises silicon as the predominant component.

6. A method according to claim 2 where the silicon-containing ceramic composite is a continuous fiber reinforced ceramic composite.

7. A method according to claim 6 where the fiber is selected from the group consisting of carbon, silicon carbide, silicon carbide-containing material, and mixtures thereof.

8. A method according to claim 6 where the fiber has at least one coating on the fiber surface.

9. A method according to claim 8 where the coating is selected from the group consisting of boron nitride, silicon doped boron nitride, silicon nitride, silicon carbide, carbon and mixtures thereof.

10. A method according to claim 1 where the combustion gas environment contains products from combustion of liquid fuels, natural gas, hydrogen or coal.

11. A method according to claim 10 where the products from combustion of fuel contain up to about nineteen percent water vapor by volume.

12. A method according to claim 1 where the silicon is injected into combustion gases, fuel, combustion air or mixtures thereof.

13. A method according to claim 1 where the silicon or silicon-containing compound is injected as solid matter, a slurry, a liquid, a liquid solution, an atomizing spray, a gaseous substance or a mixture thereof.

14. A method according to claim 1 where an effective amount is about 0.01 to about 10.0 parts per million by weight of the combustion gases.

15. A method according to claim 1 where the silicon-containing ceramic or silicon-containing composite has a silica film on its surface.

16. A method according to claim 1 where the combustion gas environment is at a temperature of at least 500° C.

17. A method according to claim 16 where the temperature is above 1000° C.

18. The method of claim 1, comprising injecting silicon to a silicon level of about 0.01 to about 10.0 parts per million by weight of combustion gases.

19. The method of claim 1, comprising injecting silicon to a silicon level of about 0.009 to about 0.6 parts per million by weight of combustion gases.

20. A method according to claim 1 where the silicon-containing compound is selected from the group consisting of siloxanes, silanes, silica, silicones, silicon carbides, silicon nitrides, silicon oxides, silicates, sand and, mixtures thereof.

21. A method according to claim 20 where the siloxane is octamethylcyclotetrasiloxane, hexamethyldisiloxane or mixtures thereof.

22. A method to maintain long-term chemical durability of silicon-containing ceramics or silicon-containing composites in combustion gas environments comprising mixing parts per million of silicon or silicon-containing compounds in combustion gases during operation where the silicon or silicon-containing compounds are mixed in the combustion gas environment to prevent or reduce volatilization of a silica film located on the silicon-containing ceramic and silicon-containing ceramic composites.

23. A method according to claim 22 where the silicon-containing ceramic is selected from the group consisting of silicon carbide, silicon nitride, silicon-silicon carbide, molybdenum silicide, and mixtures thereof.

24. A method according to claim 23 where the silicon-containing ceramic is silicon carbide.

25. A method according to claim 22 where the silicon-containing ceramic composite is selected from the group consisting of silicon carbide, silicon nitride, silicon-silicon carbide, molybdenum silicide and mixtures thereof.

26. A method according to claim 25 where the silicon-containing ceramic composite is a continuous fiber ceramic composite.

27. A method according to claim 26 where the fiber is selected from the group consisting of carbon, silicon carbide, silicon carbide-containing material, and mixtures thereof.

28. A method according to claim 26 where the fiber has at least one coating on the fiber surface.

29. A method according to claim 28 where the coating is selected from the group consisting of boron nitride, silicon doped boron nitride, silicon nitride, silicon carbide, carbon and mixtures thereof.

30. A method according to claim 22 where the combustion gas environment contains products from combustion of liquid fuels or natural gas.

31. A method according to claim 30 where the products from combustion fuel contain up to about nineteen percent water vapor by volume.

32. A method according to claim 22 where the silicon is injected into combustion gases, fuel, combustion air or mixtures thereof.

33. A method according to claim 22 where the silicon or silicon-containing compound is mixed as solid matter, a slurry, a liquid solution, an atomizing spray, a gaseous substance or a mixture thereof.

34. A method according to claim 22 where about 0.01 to about 10.0 parts per million by weight of silicon or silicon-containing compounds are mixed with the combustion gases.

35. A method according to claim 22 where the silicon-containing ceramic or silicon-containing ceramic composite is a combustion liner, a shroud, or a mixture thereof.

36. A method according to claim 22 where the silicon-containing ceramic or silicon-containing composite has a silica film on its surface.

37. A method according to claim 22 where the combustion gas environment is at a temperature of at least 500° C.

38. A method according to claim 37 where the temperature is above 1000° C.

39. A silicon-containing ceramic or ceramic composite component in a combustion gas environment, according to claim 22, of at least 500° C. having a chemically stable silicon oxide film on a surface of said ceramic or ceramic composite component.

40. A method according to claim 22 where the silicone-containing compound is a low viscosity liquid.

41. A method according to claim 22 where the silicone-containing compound is a low viscosity liquid.

42. The method of claim 22, comprising injecting silicon to a silicon level of about 0.01 to about 10.0 parts per million by weight of combustion gases.

43. The method of claim 22, comprising injecting silicon to a silicon level of about 0.009 to about 0.6 parts per million by weight of combustion gases.

44. A method according to claim 22 where the silicon-containing compound is selected from the group consisting of siloxanes, silanes, silica, silicones, silicon carbides, silicon nitrides, silicon oxides, silicates, sand and, mixtures thereof.

45. A method according to claim 44 where the siloxane is octamethylcyclotetrasiloxane, hexamethyldisiloxane or mixtures thereof.

* * * * *